Sept. 22, 1970           A. PITNER           3,529,344
METHOD FOR PRODUCING A SHEET METAL UNIVERSAL JOINT FORK
Filed Jan. 22, 1969           3 Sheets-Sheet 3
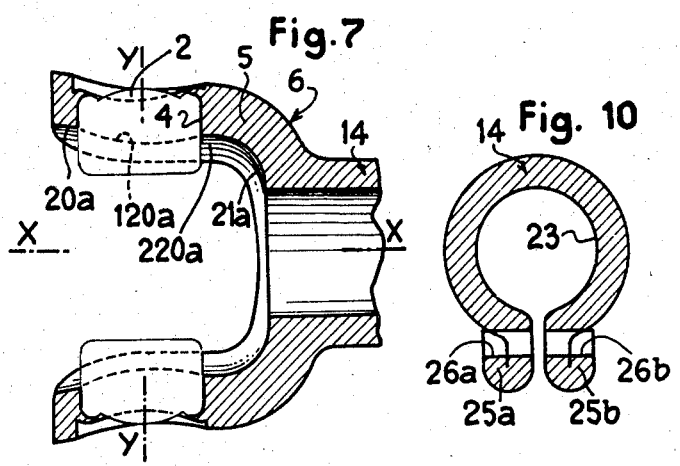
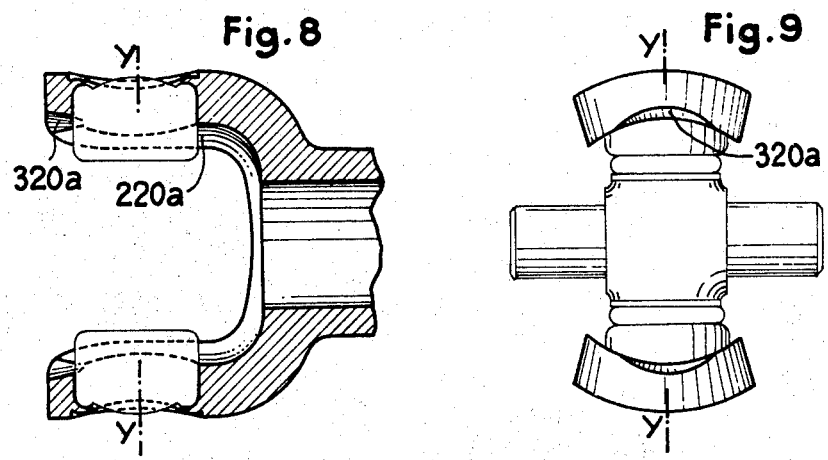
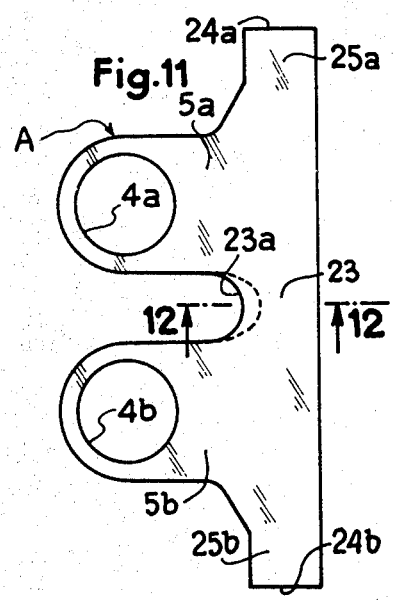
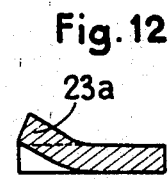

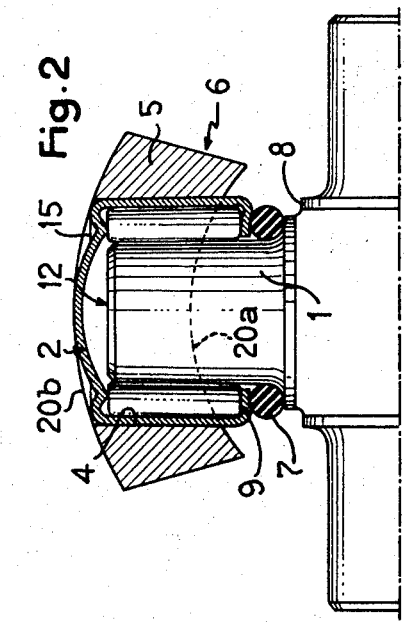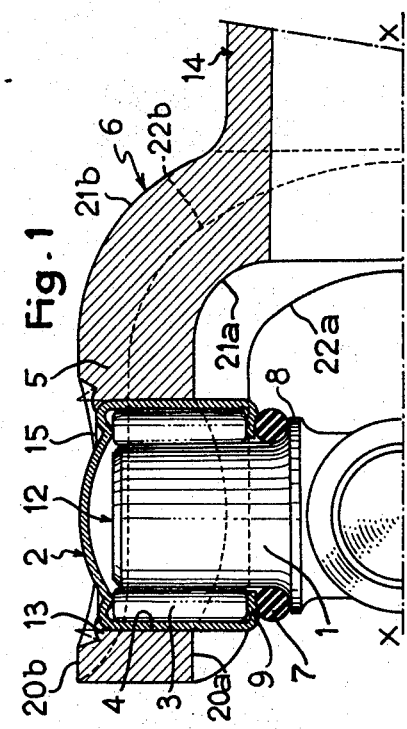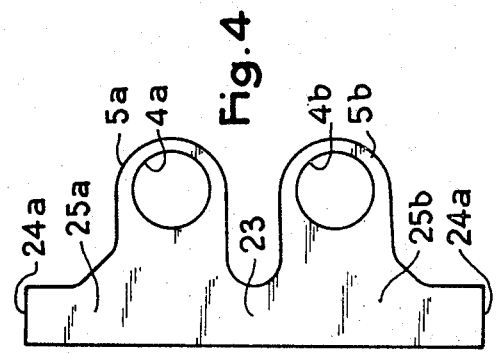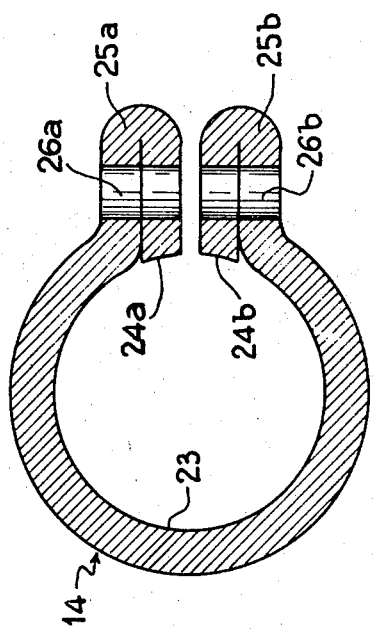

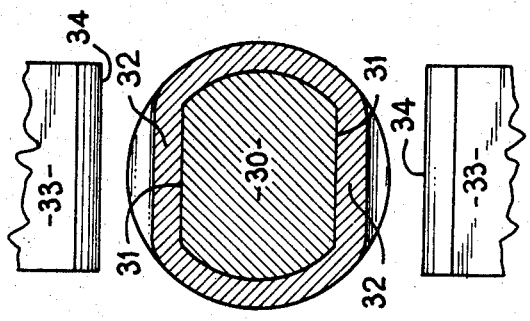
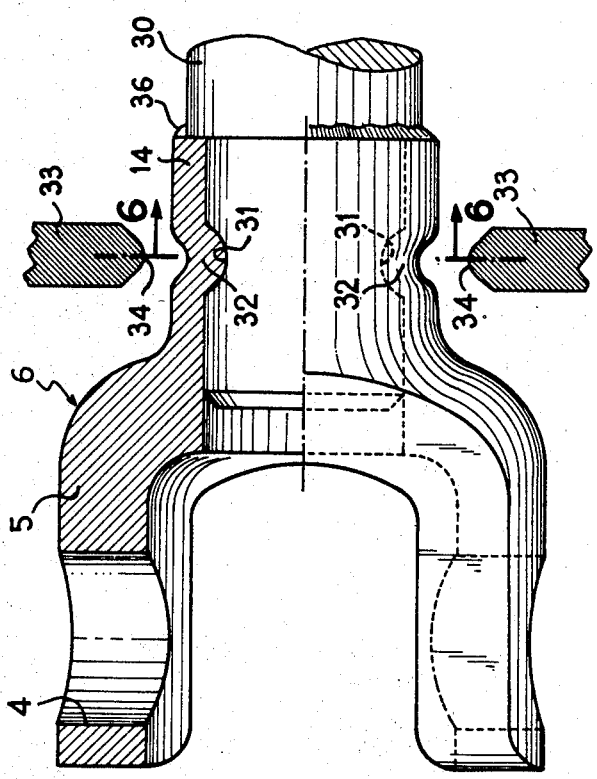

3,529,344
METHOD FOR PRODUCING A SHEET METAL UNIVERSAL JOINT FORK

Alfred Pitner, Paris, France, assignor to Nadella S.A., Rueil-Malmaison, France, a French body corporate
Continuation-in-part of application Ser. No. 677,625, Oct. 24, 1967. This application Jan. 22, 1969, Ser. No. 793,090
Claims priority, application France, Jan. 30, 1968, 83,342
Int. Cl. B21d *51/00;* B23p *11/00;* F16d *3/26*
U.S. Cl. 29—438                                    3 Claims

ABSTRACT OF THE DISCLOSURE

Method for producing a universal joint fork having a hub portion for mounting on one of the shafts interconnected by the joint. The method comprises producing the fork from a sheet metal blank which is cut to form two tabs from which the two branches of the fork are formed and a portion from which the hub is formed. The branches are so formed that they have a concave face facing the axis of rotation of the fork in the region of the branch corresponding to the bore receiving the trunnion of the cross member.

---

This application is a continuation-in-part of application Ser. No. 677,625 filed Oct. 24, 1967. The present invention relates to the manufacture of forks for universal joints comprising two forks having a tubular hub for fixing on a shaft and a cross whose four journals are each capped by a needle-containing cup which is maintained in the bore of the corresponding fork.

An object of the invention is to provide a manufacturing method wherein the universal joint forks are shaped from a sheet of metal and in such manner that, in the region of the bore, the section perpendicular to the axis of each fork branch has an inwardly-facing concavity.

The concave shape, obtained for example by a cylindrical or conical bending of the fork branches, affords on each side of the plane of symmetry of the fork the best position of support for the cups in the bores in the direction of the forces to be transmitted. Further, in the plane of symmetry, this shape affords, inside, the best possible clearance for mounting the cross by a pivoting movement and, outside, a sufficient difference in level for producing under the best shaping conditions radial projections from the edge of the bores for axially retaining the cups if this is desired.

In the case where the tubular hub is in the form of a split tube obtained from a blank of sheet metal in the form of a strip having, for forming the branches of the fork, two tabs interconnected by a curvilinear portion, the tube being produced by bending the blank after folding the ends thereof so as to produce two ears for clamping by means of a screw and nut, the curvilinear portion is subjected to considerable stresses owing to the elongation that it undergoes due to the difference between the distance between the branches of the fork and the diameter of the bore of the hub.

This drawback is remedied in another embodiment of the invention wherein the curvilinear portion of the initial blank is offset or deformed out of the plane of the blank so as to form a warped curve whose development is greater than that of the plane curve which would be the projection thereof in the plane of the sheet.

This affords additional material which is absorbed during the subsequent forming operation and avoids any abnormal stress in the sheet.

Further features and advantages of the invention will be apparent from the ensuing description with reference to the accompanying drawing.

In the drawing:

FIG. 1 is a partial axial sectional view of a universal joint in the plane of symmetry of the fork;

FIG. 2 is a partial sectional view of the universal joint in the plane of symmetry of the cross;

FIG. 3 is a cross-sectional view of the hub constructed by folding and rolling operation;

FIG. 4 is a blank of a metal sheet from which a fork provided with the hub shown in FIG. 3 is obtained;

FIG. 5 is an axial sectional view of means for interconnecting the hub shown in FIG. 1 and the corresponding shafts;

FIG. 6 is a cross-sectional view taken along line 6—6 of FIG. 5;

FIG. 7 is a partial sectional view of another embodiment of a universal joint through the plane of symmetry of the jaw;

FIGS. 8 and 9 are respectively partial sectional views of the universal joint shown in FIG. 7 in the planes of symmetry of the fork and cross of the joint;

FIG. 10 is a sectional view of a hub produced by folding and rolling in a plane perpendicular to the axis of the hub;

FIG. 11 shows a sheet metal blank from which a fork provided with a split hub is obtained, and FIG. 12 is a sectional view taken along line 12—12 of FIG. 11.

The journals 1 are capped by a cup 2 which contains needles 3 and is fitted in a bore 4 in the branch 5 of the fork 6. A seal is afforded by a round-section ring 7 of elastomer clamped between a flange 8 on the journal and a radial edge 9 formed at the free end of the cup.

The branches 5 and hub 14 of the fork 6 are constructed from a single plane sheet of metal. The part of the latter corresponding to the branches 5 is cylindrically bent so as to form in the region of the bore 4 of each branch an inwardly-facing concavity 20a in a plane perpendicular to the axis X—X of the fork.

This substantially part-circular shape affords in the median part of the fork 5 a wide passage for mounting the cross by a tilting movement permitted by the distance between the end faces 12 of the journals and the diameter of the flanges 8. Further, on either side of the cup 2, in the plane of symmetry of the cross, that is, in the direction of the applied forces, the cup 2 is supported in the bore 4 by bearing faces substantially in alignment with the needles.

The outer face 20b (FIG. 1) of the branch 5 is at a distance substantially greater from the axis X—X than the edge 15 of the end wall of the cup 2. This facilitates the production of a local deformation constituting a radial projection 13 in the bore 4 for axially retaining the cup 2.

The toric faces, namely the inner face 21a and outer face 21b, provided between the branches 5 and the hub 14 and defined by edges 22a and 22b respectively afford maximum stiffness against forces applied in the plane of symmetry of the cross substantially in the region of the centre of gravity of the surface of the journals 1.

The hub 14 shown in FIG. 1 can be constructed by press-forming the aforementioned plane sheet of metal by means of a punch acting along the axis X—X which imparts thereto, as shown, a thickness which is less than that of the branches 5. On the other hand, the hub 14 shown in FIG. 3 has a part-cylindrical inner face 23, constructed by rolling a sheet metal blank A (FIG. 4) and two faces 24a and 24b constituted by the edges of said sheet metal blank which has been folded onto itself so as to form two ears 25a, 25b in the course of an operation which was carried out before rolling the portion 23. Two aligned apertures 26a, 26b are provided for mounting a screw and a nut which, after a final forming operation, for example the provision of splines on the rough bore constituted by the faces 23, 24a and 24b, permit the clamping of the inner face of the hub on a corresponding splined shaft so as to ensure a good contact betwen the splined portions and prevent axial displacement of the hub.

The sheet of metal A also comprises tabs 5a, 5b which are provided, if desired, with apertures 4a and 4b and intended to form the two branches 5 of the complete fork. It will be understod that the bores 4 corresponding to the apertures 4a, 4b must be machine-finished before the cups 2 are placed in position.

FIG. 5 shows diagrammatically how the hub 14 shown in FIG. 1, which has the shape of a continuous tube, can be fixed to the corresponding shaft 30. The latter comprises two diametrally opposed tangential recesses 31 into which the cylindrical wall 32 of the hub 14 has been radially upset by means of two tools 33 whose straight working edges 34 are tangential to the hub 14. A weld 36, which can be continuous or discontinuous, can be made in the conventional manner at the free end of the hub 14 so as to provide a further connection to the shaft 30.

In the embodiment shown in FIG. 7, the fork 6 is obtained from a metal sheet having a generally plane shape, the portion thereof corresponding to the branches 5 being bent in such manner as to produce in the region of the bore 4 a section, perpendicular to the axis X—X of the fork, which has in respect of each branch an inwardly facing concavity 20a.

This substantially circular shape offers, in the middle portion of the branches 5, a wide passage for mounting the cross by tilting the latter, this passage being increased in FIG. 7 by the utilization of an outwardly divergent conical face 120a which extends a cylindrical portion 220a extending a face 21a having a toric shape between the branches 5 and the hub 14.

In FIGS. 8 and 9, the passage provided for mounting the journal is improved by a local crushing 320a of the sheet formed on the end edge of the branch 5 on both sides of the axial plane of symmetry Y—Y and on the inner face of the branch.

Whereas the hub 14 shown in FIG. 7 can be produced by stamping the sheet along the axis X—X, which results, as shown, in a thickness less than that of the branches 5, the hub 14 shown in FIG. 10 has on its inner face a cylindrical portion 23 formed by rolling a sheet A (FIG. 11) whose two end portions 24a and 24b have been outwardly folded onto themselves so as to form two ears 25a, 25b in the course of an operation carried out before rolling the portion 23. The sheet metal blank A also comprises two tabs 5a, 5b which are provided, if desired, with apertures 4a, 4b and are adapted to form the two branches 5 of the complete fork. It will be understood that the bores 4 corresponding to the apertures 4a, 4b must be subjected to a finishing machining before the needle cups 2 are placed in position.

The rolling or bending of the sheet A gives rise to some difficulties of application in certain cases for the following reasons:

The required distance between the two branches 5 of the fork—which is a function of the permissible load on the needles for a given torque to transmit—and the diameter of the portion 23—which is a function of the type of assembly to produce—have no relationship as concerns their respective dimensions.

On the other hand, from the point of view of the sheet A, the portion 23a of the periphery of the blank A which has a concave shape in the vicinity of the plane of symmetry of the blank undergoes stresses owing to its elongation required at the moment of forming, this elongation being the greater as the difference is greater between the distance between the forks 5 and the diameter of the bore 23 of the hub.

One solution would be to increase the development of this portion along the dotted line shown in FIG. 11 so as to result in a lower percentage of elongation. However, this solution has for major drawback to increase the offset of the bores axially of the fork relative to the hub and consequently decrease the stiffness of the fork and the strength of the universal joint resisting the torques applied thereto.

The embodiment shown in FIG. 12 provides a better solution in that the development of the portion 23a is increased by deforming it away from the plane of the blank A (FIG. 11) in the form of a flange which is inclined, relative to the plane of the blank, from the edge of the blank toward the plane of the blank. FIG. 12 shows the section what might be called a reserve of metal and thus reduces the rate of elongation of the metal. The forming stresses set up when subsequently forming the hub 14 will result in the flange losing its inclination and resuming its initial sectional shape shown in dotted line in FIG. 12, which results in a substantially cylindrical hub 14.

Two aligned apertures 26a and 26b permit the mounting of a screw and nut which, after a final shaping (for example splining) of the rough bore formed on the face 23 will permit the clamping of this face on a corresponding splined shaft so as to ensure good contact between the splined portions and preclude axial displacement.

Although specific embodimens of the invention have been described, many modifications and changes may be made therein without departing from the scope of the invention as defined in the appended claims.

Having now described my invention what I claim as new and desire to secure by Letters Patent is:

1. A method for shaping a sheet of metal for producing a fork of a universal joint having a split tubular hub portion having axially extending ear portions which define the split and can be clamped together for fixing the fork on the corresponding shaft, said method comprising cutting a blank of sheet metal comprising two tabs for forming the branches of the fork which extend from a solid strip portion, folding the end portions of said strip portion onto itself, bending the part of the strip portion between the folded end portions into the form of a cylinder, folding said end portions in such manner as to form two parallel ears, and forming two aligned apertures in said ears for the passage of a clamping screw.

2. A method as claimed in claim 1, wherein said tabs are in spaced relation in the plane of the blank and interconnected by an intermediate portion defining an edge of said blank which has a substantially arcuate shape and joins with the corresponding edges of said tabs, said method further comprising deforming a part of said intermediate portion away from the plane of the blank, before bending the strip portion, in such manner as to form a marginal flange portion which is inclined, relative to the plane of said blank, from said edge toward the plane of said blank, whereby the development of said part of said intermediate portion is increased.

3. A method for shaping a sheet of metal for producing a fork of a universal joint having a tubular hub portion for fixing the fork to a shaft, said method comprising pressing and forming the hub portion in a sheet of metal, blanking the sheet of metal to constitute tab portions diametrally extending from the hub portion and forming said tab portions so that they extend axially of the hub portion and have an inwardly facing concavity in a plane perpendicular to the axis of the hub portion.

References Cited

UNITED STATES PATENTS

| | | | |
|---|---|---|---|
| 1,389,422 | 8/1921 | Curtis | 64—17 |
| 1,502,133 | 7/1924 | Anderson | 29—175 |
| 1,503,263 | 7/1924 | Carlson | 113—116 |
| 2,067,283 | 1/1937 | Padgett | 29—438 X |

THOMAS H. EAGER, Primary Examiner

U.S. Cl. X.R.

64—17; 113—116

UNITED STATES PATENT OFFICE
CERTIFICATE OF CORRECTION

Patent No. 3,529,344                          Dated September 22, 1970

Inventor(s) ALFRED PITNER

It is certified that error appears in the above-identified patent and that said Letters Patent are hereby corrected as shown below:

In the Heading, Column 1, line 4, after "assignor" insert --of a one-half interest--.

Column 1, lines 9 and 10, delete "application France, Jan. 30, 1968, 83,342" and insert --applications France, Nov. 10, 1966 No. 83,342 and France, Jan. 30, 1968 No. 137,889--.

Signed and sealed this 12th day of February 1974.

(SEAL)
Attest:

EDWARD M. FLETCHER, JR.              C. MARSHALL DANN
Attesting Officer                    Commissioner of Patents